(12) United States Patent
Bähr et al.

(10) Patent No.: US 6,588,196 B1
(45) Date of Patent: Jul. 8, 2003

(54) GAS AND STEAM TURBINE SYSTEM

(75) Inventors: Siegfried Bähr, Eggolsheim (DE); Sergej Reissig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/660,868

(22) Filed: Sep. 13, 2000

(30) Foreign Application Priority Data

Sep. 13, 1999 (DE) .......................... 199 43 782

(51) Int. Cl.[7] .............................. F02C 6/18; F02C 7/10; F02C 7/14
(52) U.S. Cl. ................. 60/39.182; 60/39.511; 60/728
(58) Field of Search .................. 60/39.182, 39.511, 60/728

(56) References Cited

U.S. PATENT DOCUMENTS

| | | | |
|---|---|---|---|
| 2,633,707 A | * | 4/1953 | Hermitte et al. ......... 60/39.182 |
| 4,922,709 A | | 5/1990 | Hendriks |
| 5,212,942 A | | 5/1993 | Malohn |
| 5,386,685 A | * | 2/1995 | Frutschi ................... 60/39.182 |

FOREIGN PATENT DOCUMENTS

| | | |
|---|---|---|
| AT | 199 951 | 10/1958 |
| DE | 196 12 921 A1 | 10/1997 |
| DE | 199 24 067 A1 | 7/2000 |
| EP | 0 770 771 A1 | 5/1997 |

* cited by examiner

Primary Examiner—Louis J. Casaregola
(74) Attorney, Agent, or Firm—Laurence A. Greenberg; Werner H. Stemer; Ralph E. Locher

(57) ABSTRACT

As the development of gas and steam turbine systems has progressed, the steam turbine section, in particular, has become highly sophisticated and complex by being configured as a three-pressure system. In order to make a gas and steam turbine system of economic interest for medium and low power levels as well, and with high efficiencies, the steam turbine section is configured as a two-pressure system, and the combustion air for the system is compressed in at least two stages. In the process, the combustion air is cooled after at least one compression stage, and is heated at least after the last stage of the two stages.

9 Claims, 1 Drawing Sheet

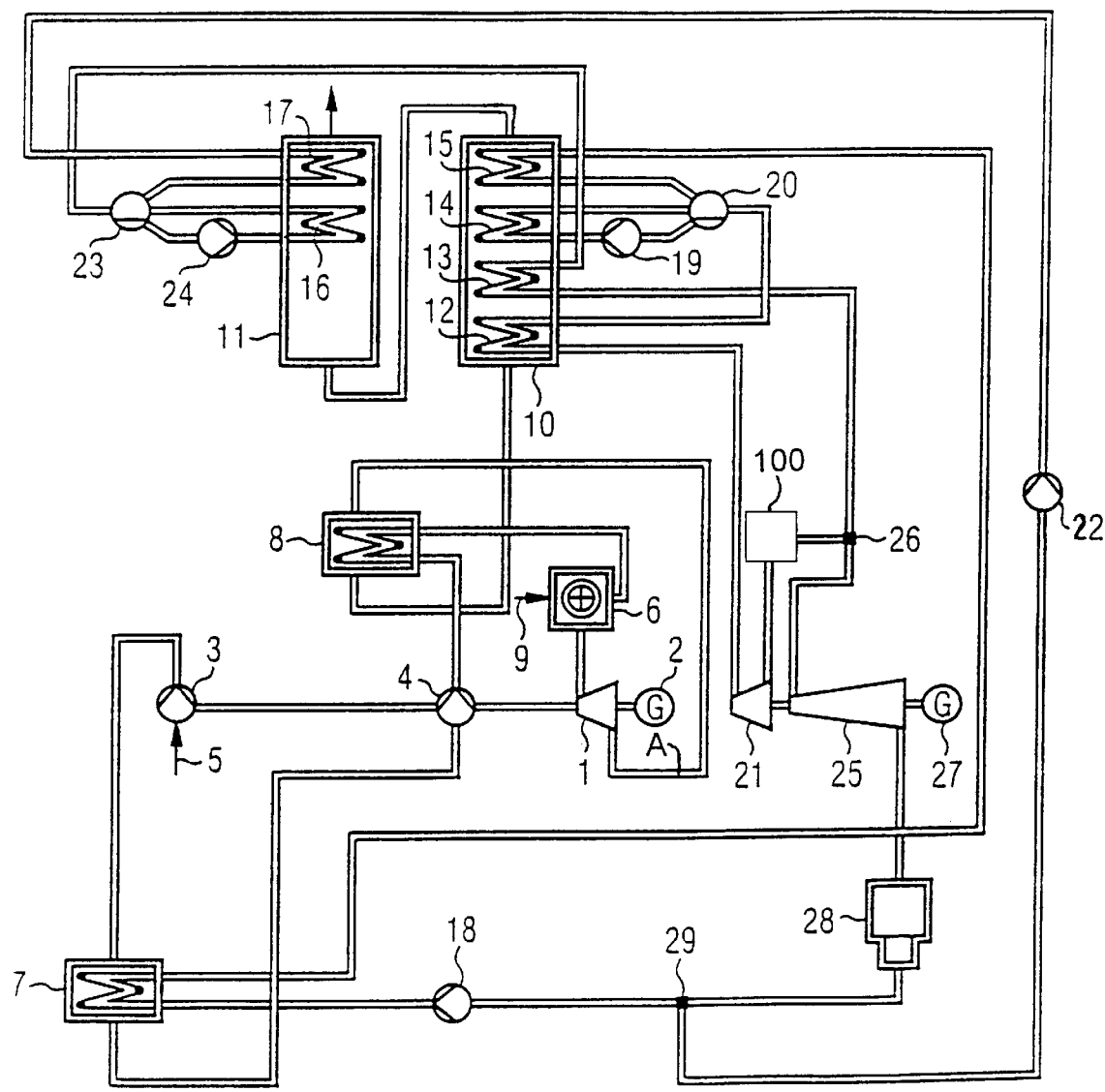

GAS AND STEAM TURBINE SYSTEM

BACKGROUND OF THE INVENTION

FIELD OF THE INVENTION

The invention relates to a gas and steam turbine system for generating electricity. The system has a steam generator generating steam for a steam turbine, which is heated by an exhaust gas from a gas turbine, and a cooling device for cooling combustion air for a gas turbine.

As systems for generating electricity have been developed, the systems have become ever more complex in order to achieve higher efficiencies. Thus, in gas and steam turbine systems, steam generators and associated steam turbines having two or more compression stages are normally positioned downstream from the gas turbine. In the process, a fresh steam condition of about 150 bars at a temperature of more than 535° C. is aimed for at a high-pressure stage.

Such systems achieve a high system efficiency of about 57 to 58%. The complexity required for this purpose for the configuration of the system and for its operation has, however, limited the use of such systems, for financial reasons, to systems with relatively high power output ratings. The high level of complexity for system construction has in this case resulted in particular from the use of special materials, which are generally expensive, and required to withstand the temperature and pressure stresses. Furthermore, the need to specify tighter tolerances for the temperature and pressure levels has resulted in a comparatively high maintenance effort, with the maintenance personnel requiring a particularly high training level to satisfy these requirements.

Published, Non-Prosecuted German Patent Application DE 199 24 067.1 proposes that the combustion air for gas turbines be cooled. For this purpose, in addition to being cooled, the combustion air is also dried and rehumidified in a complex device, so that the hardware complexity and the system maintenance effort are particularly high.

SUMMARY OF THE INVENTION

It is accordingly an object of the invention to provide a gas and steam turbine system which overcomes the above-mentioned disadvantages of the prior art devices of this general type, which is used for medium and low ratings with normal complexity, achieves particularly high efficiency and, at the same time, places only average requirements on the maintenance personnel.

With the foregoing and other objects in view there is provided, in accordance with the invention, a gas and steam turbine system for generating electricity. The system includes a gas turbine producing an exhaust gas, a steam generator that receives and is heated by the exhaust gas from the gas turbine, and a steam turbine that is connected to the steam generator and only has a medium-pressure section and a low-pressure section. A cooling and compressing device receives combustion air and is connected to and supplies the combustion air to the gas turbine. The cooling and compressing device has at least two stages for compressing the combustion air, the combustion air being cooled after at least one of the two stages in the cooling and compressing device. An air preheater is connected to the cooling and compressing device for heating the combustion air at least after a last of the two stages of the cooling and compressing device.

The object is achieved according to the invention in that the combustion air can be compressed in at least two stages, being cooled after at least one stage, and with the capability to be heated at least after the last stage of the compressor.

In this case, the steam turbine has only a medium-pressure section and a low-pressure section.

These measures reduce the system complexity for the steam turbine to about two thirds of the complexity required for a conventional gas and steam turbine system and, increase the rating of the gas turbine by reducing the compression power.

Omitting the high-pressure turbine achieves a considerable cost advantage in terms of the production costs for the gas and steam turbine system. Cooling and heating the combustion air in two stages reduces the power consumption, in particular the compressor power consumption, and at the same time increases both the gas turbine power and its efficiency. Overall, the system concept according to the invention for a gas and steam turbine system results in an efficiency comparable with known systems, while resulting in considerably reduced financial costs.

The combustion air is advantageously cooled using boiler supply water of a medium-pressure steam generator in at least one air/water heat exchanger. The combustion air is expediently heated, before entering the combustion chamber, in an air preheater by the exhaust gas from the gas turbine.

In accordance with an added feature of the invention, a combustion chamber is provided that is connected between the air preheater and the gas turbine. The air preheater is connected to and receives the exhaust gas from the gas turbine, and the combustion air is heated before entering the combustion chamber in the air preheater by the exhaust gas from the gas turbine.

In accordance with another feature of the invention, the steam generator includes a medium-pressure steam generator generating superheated steam that is supplied to the steam turbine, and a low-pressure steam generator generating further superheated steam that is also supplied to the steam turbine.

In this case, the rating of the gas turbine may be approximately equal to three-times the rating of the steam turbine to which superheated steam is applied from a medium-pressure steam generator and from a low-pressure steam generator.

It is expedient to split condensation emerging from a condenser, which is positioned downstream from the steam turbine, into two flow elements of approximately equal magnitude, one of which can be supplied to the medium-pressure section and the other to the low-pressure section of the steam generator.

The steam emerging from the medium-pressure turbine can be combined, either with or without intermediate superheating, with the steam coming from the low-pressure section of the steam generator, and supplied to the low-pressure turbine.

In the medium-pressure steam generator and the low-pressure steam generator, the exhaust gas from the gas turbine can successively heat a medium-pressure superheater, a low-pressure superheater, a medium-pressure vaporizer, a medium-pressure preheater, a low-pressure vaporizer and a low-pressure preheater. Furthermore, in some cases, it is worth heating the steam emerging from the medium-pressure section of the steam turbine in an intermediate superheater, before it is combined with the steam from the low-pressure superheater.

Overall, so much heat can be extracted from the exhaust gas from the gas turbine in the steam generator that its temperature when it emerges from the steam generator is actually less than 100° C.

According to the invention, all the compressors may have approximately the same compression power. The heating power for heating the combustion air in the air preheater may also be approximately equal to five-times the cooling power in the air/water heat exchanger or exchangers. In this case, the heating power introduced by the exhaust gas into the medium-pressure steam generator and into the low-pressure steam generator may be virtually twice as great as the heating power in the air preheater.

Gas and steam turbine systems configured according to the invention are highly advantageous since they achieve approximately the same efficiency as, or greater efficiency than conventional systems, using a two-pressure steam turbine system. In particular, it is possible to dispense with the use of particularly expensive special materials for the steam generator and the steam turbine. This is achieved, for example, by the low inlet temperatures of the hot gas, in particular of the burnt gas, into the gas turbine which are possible. Furthermore, the construction and the circuit of the new systems are also relatively simple, so that maintenance can be carried out by personnel with average training.

Other features which are considered as characteristic for the invention are set forth in the appended claims.

Although the invention is illustrated and described herein as embodied in a gas and steam turbine system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a diagrammatic illustration of a gas and steam turbine system according to the invention.

DESCRIPTION OF THE PREFERRED EMBODIMENT

Referring now to the single FIGURE of the drawing in detail, there is shown a gas turbine 1 that drives a generator 2 for electricity generation, and two compressors 3 and 4, which are disposed on a common shaft and successively compress combustion air 5 in two stages to a pressure in a combustion chamber 6. Each of the two compressors 3 and 4 injects approximately the same amount of energy into the combustion air 5 which, in the exemplary embodiment, is compressed to about 5.5 bar in the first stage, and then to more than 16 bar in the second stage. Before reaching the last compressor stage before the combustion chamber 6, that is to say before the compressor 4 in the exemplary embodiment, the combustion air 5 flows through at least one air/water heat exchanger 7, where it emits a portion of its compression heat to boiler supply water for a medium-pressure steam generator. Therefore, the combustion air 5 is cooled and, in consequence, its density is correspondingly increased.

Between the compressor 4 and the combustion chamber 6, the combustion air 5 flows through an air preheater 8, which is heated by exhaust gas A from the gas turbine 1. The combustion air 5 preheated in this way is supplied to the combustion chamber 6. Here, it is used for combustion of a fuel 9, for example gas or oil, which is introduced into the combustion chamber 6. The energetic burnt gas produced in this way is at a temperature of somewhat less than 1200° C., and drives the gas turbine 1.

The burnt gas, expanded virtually to ambient pressure, is still at a temperature of, for example, 550° C., leaves the gas turbine 1 as the exhaust gas A, and heats the combustion air 5 in the air preheater 8. In the process the exhaust gas temperature falls by approximately one third and is still useable upon leaving the air preheater 8. After leaving the air preheater 8, the exhaust gas A, whose energy has already become low, flows into two series-connected steam generators 10 and 11, the first of which is a medium-pressure steam generator 10, and the second a low-pressure steam generator 11. There, it essentially successively heats a medium-pressure superheater 12, a low-pressure superheater 13, a medium-pressure vaporizer 14, a medium-pressure preheater 15, a low-pressure vaporizer 16 and a low-pressure preheater 17. An intermediate superheater, which may be required but is not shown in the drawing, is disposed upstream of, alongside or between the medium-pressure superheater 12 and the low-pressure superheater 13.

In boundary conditions different to those envisaged for the exemplary embodiment, the sequence of the individual heat exchangers 12 to 17 within the steam generators 10, 12 may also be varied. In particular, it may in each case be worth positioning a number of the heat exchangers 12 to 17 alongside one another in the same temperature stage of the exhaust gas.

After emerging from the steam generator 11, residual heat that is still present in the exhaust gas, for example at a temperature of less than 100° C., is used to ensure the operational reliability of components and exhaust gas cleaning systems which are not shown.

A boiler supply water pump 18 for a medium-pressure steam generator 21 raises boiler supply water to a pressure of about 40 bar, for example. It forces this water through a water side of the air/water heat exchanger 7. Here, the boiler supply water is preheated, for example, to approximately 200° C. The preheated boiler supply water then flows, absorbing further heat, through the medium-pressure preheater 15 into the medium-pressure vaporizer 14. A circulation pump 19 forces the preheated boiler supply water in the small circuit through the medium-pressure vaporizer 14 into an intermediate reservoir 20, in which steam and water are separated from one another by the force of gravity. The water is once again forced through the medium-pressure vaporizer 14 by the circulation pump 19, together with newly flowing-in boiler supply water. The steam formed in the medium-pressure vaporizer 14 flows through the medium-pressure superheater 12 and from there as fresh steam into the medium-pressure section 21 of a steam turbine.

A boiler supply water pump 22 for a low-pressure steam generator 25 of the steam turbine conveys boiler supply water at a pressure of about 1 bar through the low-pressure preheater 17 into an intermediate reservoir 23 for the low-pressure vaporizer 16. A circulation pump 24 forces water out of the intermediate reservoir 23 through the low-pressure vaporizer 16. Steam which accumulates in the steam area of the intermediate reservoir 23 flows through the low-pressure superheater 13 as fresh steam to the low-pressure section 25 of the steam turbine. The low-pressure steam absorbs the output steam from the medium-pressure section 21 at a collection point 26. The output steam from the medium-pressure section 21 is, if required, raised in the intermediate superheater 100 (heat source to the superheater 100 is not illustrated in the FIGURE of the drawing) at least to the temperature of the fresh steam from the low-pressure superheater 13.

The medium-pressure section 21 and the low-pressure section 25 are part of one and the same steam turbine, which drives a generator 27 in order to generate electricity. Output steam from the steam turbine flows into a condenser 28, which is cooled in a suitable manner —for example by water or air. Condensation formed in the process flows out of the condenser 28 to a separation point 29, and from there, as boiler supply water, either to the boiler supply water pump 18 or to the boiler supply water pump 22.

We claim:

1. A gas and steam turbine system for generating electricity, comprising:
   a steam turbine, said steam turbine having a power rating;
   a gas turbine producing an exhaust gas and having a power rating approximately equal to three-times said power rating of said steam turbine;
   a steam generator receiving and heated by the exhaust gas from said gas turbine, said steam generator having a high-pressure steam generator and a low-pressure steam generator each generating superheated steam and being connected to and supplying said steam turbine with the superheated steam;
   a compressing device receiving combustion air and connected to and supplying the combustion air to said gas turbine, said compressing device having at least two stages for compressing the combustion air;
   an air/water heat exchanger connected to said compressing device and connected to said steam generator and receiving boiler supply water from said steam generator; and
   an air preheater connected to said compressing device, the combustion air being cooled by said air/water heat exchanger after at least one of said two stages in said compressing device, and being heated by said an air preheater using said exhaust gas after a last of said two stages of said compressing device.

2. The gas and steam turbine system according to claim 1, including a combustion chamber connected between said air preheater and said gas turbine, said air preheater connected to and receiving the exhaust gas from said gas turbine, and the combustion air being heated before entering said combustion chamber in said air preheater by the exhaust gas from said gas turbine.

3. The gas and steam turbine system according to claim 1, including a condenser producing condensation and connected between said steam generator and said compressing device, the condensation emerging from said condenser being split into a first flow element and a second flow element of approximately equal magnitude, said first flow element supplied to said high-pressure steam generator and said second flow element supplied to said low-pressure steam generator.

4. The gas and steam turbine system according to claim 3, wherein said low-pressure section of said steam turbine has an inlet and said first flow element and said second flow element of the condensation are recombined again at said inlet of said low-pressure section of said steam turbine.

5. The gas and steam turbine system according to claim 4, wherein said high-pressure steam generator and said low-pressure steam generator are disposed downstream from said air preheater and combined have a high-pressure superheater, a low-pressure superheater, a high-pressure vaporizer, a high-pressure preheater, a low-pressure vaporizer and a low-pressure preheater, and the exhaust gas from said gas turbine successively heats said high-pressure superheater, said low-pressure superheater, said high-pressure vaporizer, said high-pressure preheater, said low-pressure vaporizer, and said low-pressure preheater.

6. The gas and steam turbine system according to claim 1, wherein said two stages are compressors having equivalent compression powers.

7. The gas and steam turbine system according to claim 1, wherein a heating power for heating the combustion air in said air preheater is approximately equal to five-times a cooling power of said air/water heat exchanger.

8. The gas and steam turbine system according to claim 5, wherein a heating power introduced by the exhaust gas into said high-pressure steam generator and into said low-pressure steam generator together is virtually twice as great as a heating power in said air preheater.

9. The gas and steam turbine system according to claim 5, wherein when the exhaust gas emerges from said low-pressure steam generator, the exhaust gas is at a temperature of less than 100° C.

* * * * *